United States Patent
Kim et al.

(10) Patent No.: US 8,314,833 B2
(45) Date of Patent: Nov. 20, 2012

(54) METHOD FOR DISPLAYING A MULTI-VIEWPOINT IMAGE AND DISPLAY APPARATUS FOR PERFORMING THE SAME

(75) Inventors: Hee-Seop Kim, Hwaseong-si (KR); Seung-Hoon Lee, Yongin-si (KR); Hae-Young Yun, Suwon-si (KR); Sung-Woon Kim, Suwon-si (KR); Lu Jian Gang, Suwon-si (KR); Kyung-Ho Jung, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 769 days.

(21) Appl. No.: 12/469,372

(22) Filed: May 20, 2009

(65) Prior Publication Data
US 2010/0007721 A1 Jan. 14, 2010

(30) Foreign Application Priority Data
Jul. 11, 2008 (KR) ........................ 10-2008-0067330

(51) Int. Cl.
*H04N 7/18* (2006.01)
*G06F 15/16* (2006.01)
(52) U.S. Cl. ......................................................... 348/51
(58) Field of Classification Search ............... 348/51–52
See application file for complete search history.

(56) References Cited

U.S. PATENT DOCUMENTS

| | | | | |
|---|---|---|---|---|
| 5,546,158 | A | * | 8/1996 | Konishi et al. ................... 396/51 |
| 6,561,907 | B2 | * | 5/2003 | Shimizu et al. ................... 463/31 |
| 7,576,742 | B2 | * | 8/2009 | Kanematsu et al. ........... 345/427 |
| 7,777,757 | B2 | * | 8/2010 | Allio ............................... 345/589 |
| 2006/0028473 | A1 | * | 2/2006 | Uyttendaele et al. ......... 345/473 |
| 2009/0079761 | A1 | * | 3/2009 | Kokojima ...................... 345/619 |

FOREIGN PATENT DOCUMENTS

| | | |
|---|---|---|
| JP | 2003107392 | 4/2003 |
| KR | 1020060106451 | 10/2006 |
| KR | 100795481 | 1/2008 |

* cited by examiner

*Primary Examiner* — Zarni Maung
(74) *Attorney, Agent, or Firm* — H.C. Park & Associates, PLC

(57) ABSTRACT

A method for displaying a multi-viewpoint image is capable of reducing display defects, and a display apparatus to perform the method includes a display part and a driving control part. The driving control part provides the display part with a plurality of multi-viewpoint images signals. The driving control part sequentially provides the display part with a first viewpoint image to a last viewpoint image and provides the display part with a compensation viewpoint image signal that replaces the last viewpoint image signal of a frame.

18 Claims, 5 Drawing Sheets

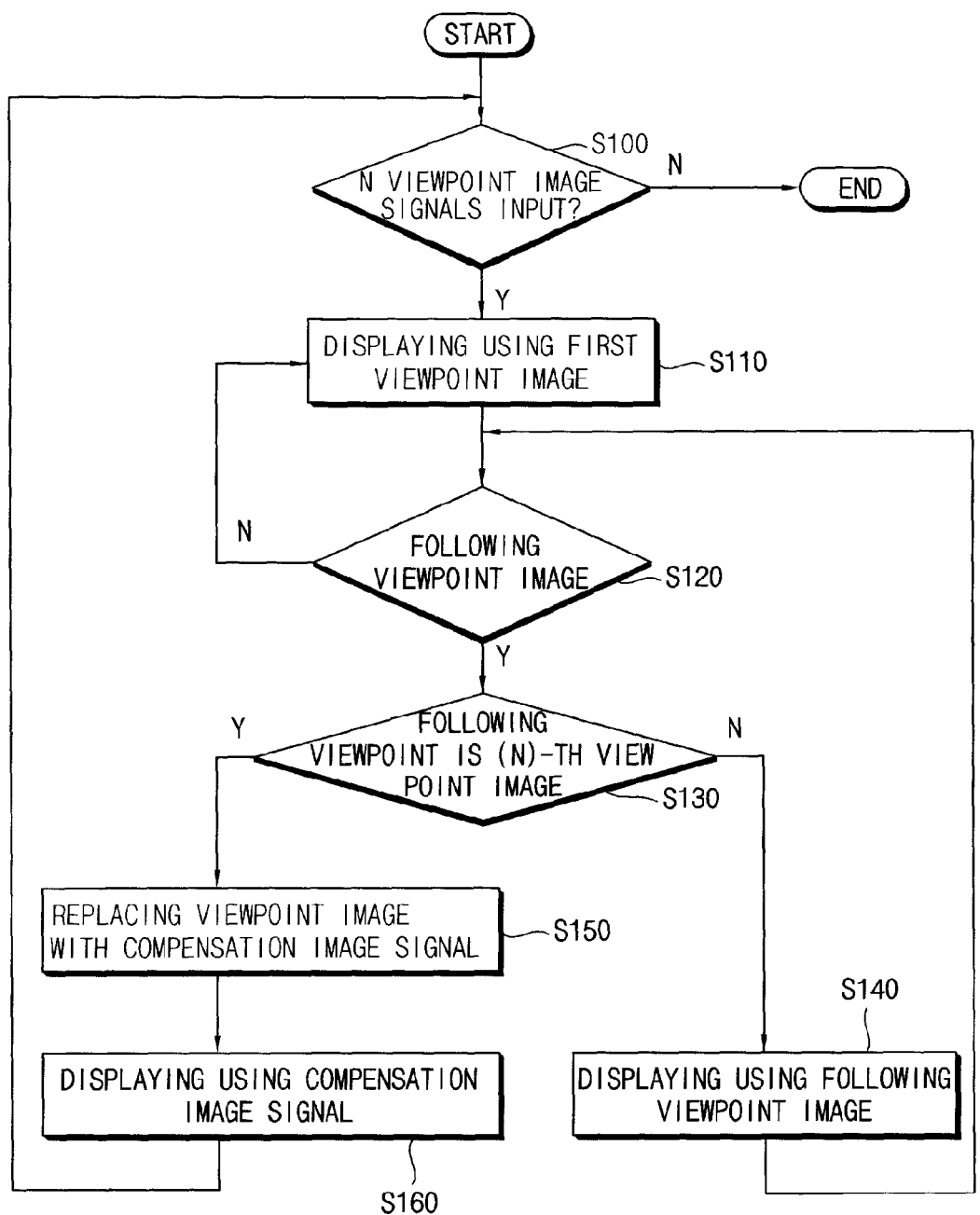

METHOD FOR DISPLAYING A MULTI-VIEWPOINT IMAGE AND DISPLAY APPARATUS FOR PERFORMING THE SAME

CROSS REFERENCE TO RELATED APPLICATION

This application claims priority from and the benefit of Korean Patent Application No. 2008-67330, filed on Jul. 11, 2008, which is hereby incorporated by reference for all purposes as if fully set forth herein.

BACKGROUND OF THE INVENTION

1. Field of the Invention

The present invention relates to a method for displaying a multi-viewpoint image, and a display apparatus for performing the method. More particularly, the present invention relates to a method for displaying a multi-viewpoint image capable of reducing display defects, and a display apparatus for performing the method.

2. Discussion of the Background

A multi-viewpoint image (i.e., a three-dimensional (3D) image) display apparatus is a device separating an image for a left eye and an image for a right eye having binocular parallax and providing the images to a left eye and a right eye of a viewer, respectively. Therefore, the viewer can view a 3D image by mentally combining an image of a left eye and an image of a right eye obtained through the retina of the two eyes of the viewer. The 3D image display apparatus can be applied to a variety of fields that may use a 3D image, for example medical treatment, games, advertisements, education, and military affairs.

Recently, a multi-viewpoint image technology has been developed in a high-quality high-definition television (HDTV). Also, as mobile communication devices have been developed, a realistic mobile multi-viewpoint image display apparatus may be used. The mobile multi-viewpoint image display apparatus may be incorporated in cellular phones, personal digital assistants (PDAs), tablet computers, laptop computers, or portable televisions.

However, in a 3D image displayed by a multi-viewpoint image display apparatus, an image inversion between the different viewpoints is generated.

For example, the multi-viewpoint image display apparatus displays a 3D image. And a viewer may view the 3D image at the positions of a plurality of groups, the groups have a plurality of view-points, respectively. According to the viewer's position, image interference (i.e., inversion area interference) between adjacent viewpoints in adjacent groups may generate display defects rather than image interference (i.e., viewpoint interference) between adjacent viewpoints corresponding to one group. The inversion area interference is an image interference generated between a last viewpoint of a first group and a first viewpoint of a second group following the first group.

SUMMARY OF THE INVENTION

The present invention provides a method for displaying a multi-viewpoint image capable of reducing display defects generated due to image discontinuity at a viewpoint boundary.

The present invention also provides a display apparatus for performing the above-mentioned method.

Additional features of the invention will be set forth in the description which follows, and in part will be apparent from the description, or may be learned by practice of the invention.

The present invention discloses a method for displaying a multi-viewpoint image. In the method, a plurality of primitive image signals is received. Then, a first viewpoint image signal to a last viewpoint image signal are provided to a display part. The first viewpoint image signal to the next to last viewpoint image signal are based on the received primitive image signals. The last viewpoint image signal is a compensation viewpoint image signal.

The present invention also discloses a method for displaying a multi-viewpoint image. In the method, it is checked whether N viewpoint image signals are inputted, wherein N is a natural number greater than 2. Then, a displaying operation using a first viewpoint image signal is performed if the N viewpoint image signals are inputted. Then, it is checked whether a following viewpoint image signal after the first viewpoint image signal is an (N)-th viewpoint image signal. Then, a displaying operation using the following viewpoint image signal is performed if the following viewpoint image signal is not the (N)-th viewpoint image signal. Then, the (N)-th viewpoint image is replaced with a compensation viewpoint image signal if the following viewpoint image signal is the (N)-th viewpoint image signal. Then, a displaying operation using the compensation viewpoint image signal is performed.

The present invention also discloses a display apparatus that includes a display part and a driving control part. The display part displays an image. The driving control part receives a plurality of primitive image signals, and provides the display part with a plurality of multi-viewpoint image signals. The driving control part provides the display part with a first viewpoint image signal to a last viewpoint image signal. The first viewpoint image signal to the next to last viewpoint image signal are based on the received primitive image signals. The last viewpoint image signal is a compensation viewpoint image signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a flow chart showing a method for displaying a multi-viewpoint image according to an exemplary embodiment of the present invention.

DETAILED DESCRIPTION OF THE ILLUSTRATED EMBODIMENTS

Figure 1:
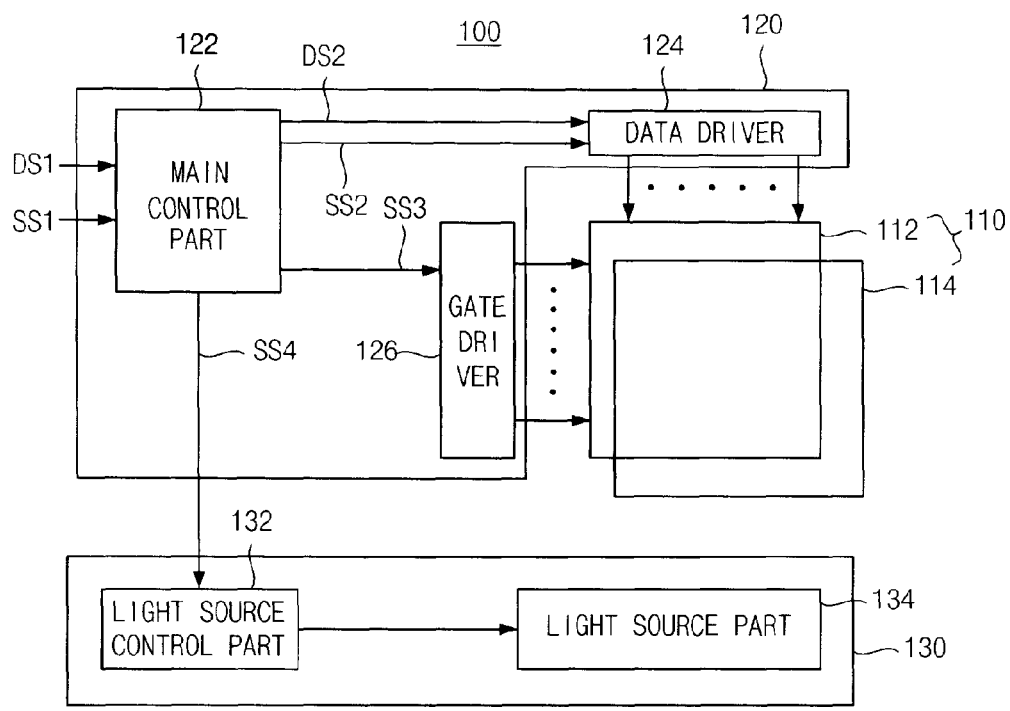
FIG. 1 is a block diagram schematically showing a multi-viewpoint image display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram schematically showing a multi-viewpoint image display apparatus according to an exemplary embodiment of the present invention.

Referring to FIG. 1, a multi-viewpoint image display apparatus 100 includes a display part 110 and a driving control part 120.

The display part 110 includes a liquid crystal display (LCD) panel 112 and a viewing area separating part 114.

The LCD panel 112 includes two substrates and a liquid crystal layer disposed between the substrates to display an image. The LCD panel 112 includes a plurality of pixels to display an image. Each pixel includes a switching element connected to a gate line and a data line, and a liquid crystal capacitor and a storage capacitor that are connected to the switching element. However, these components are not shown in the drawings. The storage capacitor may be removed.

The viewing area separating part 114 is disposed in front of the LCD panel 112 to separate a 3D image displayed on the LCD panel 112 into a left image and a right image. The viewing area separating part 114 may include a lenticular lens, a parallax barrier, etc.

The driving control part 120 provides the display part 110 with a plurality of multi-viewpoint image signals. For example, the driving control part 120 sequentially provides the display part 110 with a first viewpoint image to a last viewpoint image of one frame, and the last viewpoint image is a compensation viewpoint image signal. The compensation viewpoint image signal may be set to compensate an inversion generated between the first viewpoint image signal and the last viewpoint image signal. For one example, the compensation viewpoint image signal may be an intermediate viewpoint image signal of the multi-viewpoint image signals. For another example, the compensation viewpoint image signal may be an image signal corresponding to a white gradation. For another example, the compensation viewpoint image signal may be an image signal corresponding to a black gradation. For another example, the compensation viewpoint image signal may be an image signal corresponding to an intermediate gradation.

The driving control part 120 may include a main control part 122, a data driver 124, and a gate driver 126.

The main control part 122 receives a first control signal SS1 and a first image signal DS1. The first control signal SS1 may include a vertical synchronizing signal (Vsync), a horizontal synchronizing signal (Hsync), and a data enable signal (DE). The vertical synchronizing signal (Vsync) represents a time for displaying one frame. The horizontal synchronizing signal (Hsync) represents a time for displaying one line of the frame. Thus, the horizontal synchronizing signal (Hsync) includes pulses corresponding to the number of pixels included in one line. The data enable signal (DE) represents a time for supplying the pixel with data.

For one example, the first image signal DS1 may include a plurality of primitive image signals. For another example, the first image signal DS1 may include a plurality of multi-viewpoint image signals. That is, the first image signal DS1 may include multi-viewpoint image signals that are filmed by an external electric device (not shown) for at least two viewpoints so as to realize a 3D image.

The main control part 122 converts the first image signal DS1 into a second image signal DS2, and provides the second image signal DS2 to the data driver 124. If the first image signal DS1 is a standard image signal, the main control part 122 may convert the first image signal into a multi-viewpoint image, and may provide the second image signal DS2 as the converted multi-viewpoint image signal to the data driver 124.

Using the first control signal SS1, the main control part 122 generates a second control signal SS2 and a third control signal SS3, which control a driving timing of the LCD panel 112.

The data driver 124 generates a plurality of data signals by using the first control signal SS2 and the second image signal DS2, and provides a data line of the LCD panel 112 with the generated data signals. The second control signal DS2 may include a clock signal and a horizontal start signal STH.

Using the third control signal SS3, the gate driver 126 generates a gate signal, which activates the gate line of the LCD panel 112. The third control signal SS3 may include a vertical start signal STV.

The multi-viewpoint image display apparatus 100 may include a light source assembly 130. The light source assembly 130 includes a light source control part 132 and a light source part 134.

The light source control part 132 provides the light source part 134 with a power voltage in response to receiving a fourth control signal SS4 from the main control part 122.

The light source part 134 is disposed below the LCD panel 112 to provide the LCD panel 112 with light in response to the power voltage provided from the light source control part 132.

Figure 2:
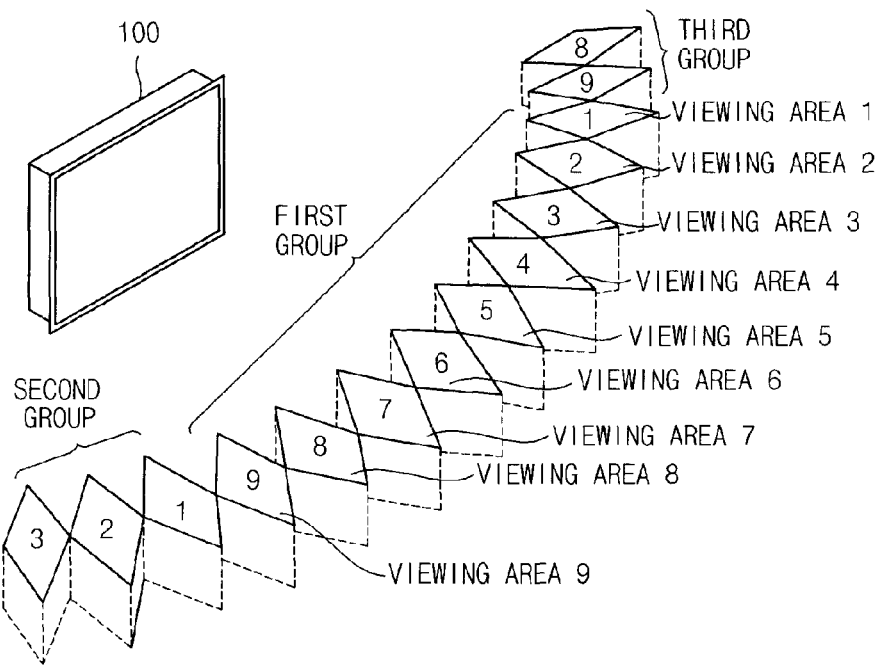
FIG. 2 is a perspective view schematically showing a multi-viewpoint image display apparatus according to an exemplary embodiment of the present invention.
Figure 3:
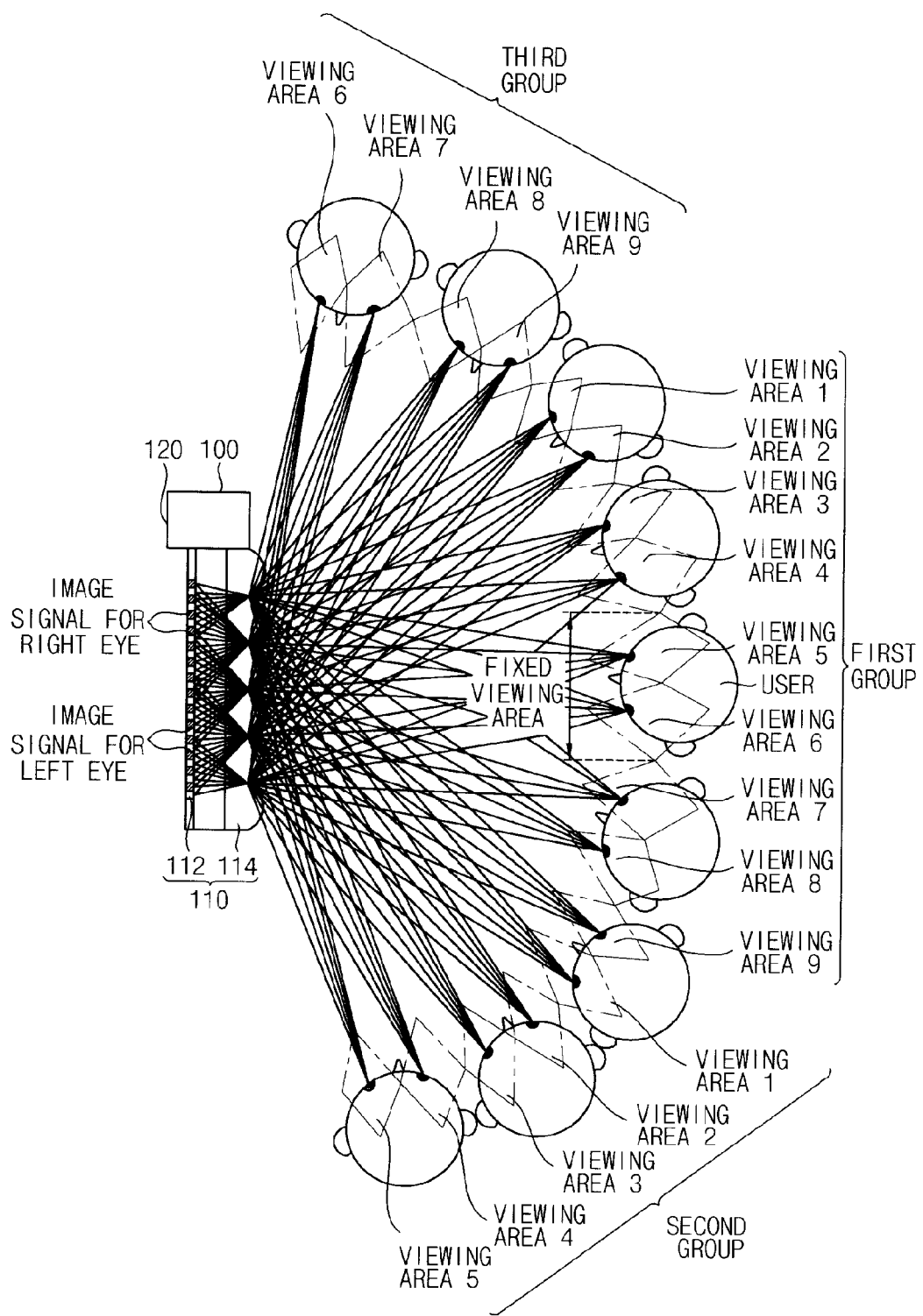
FIG. 3 is a conceptual diagram schematically showing a viewing area division of a multi-viewpoint image display apparatus of FIG. 2.

FIG. 2 is a perspective view schematically showing a multi-viewpoint image display apparatus according to an exemplary embodiment of the present invention. FIG. 3 is a conceptual diagram schematically showing a viewing area division of a multi-viewpoint image display apparatus of FIG. 2.

Referring to FIG. 2 and FIG. 3, a multi-viewpoint image display apparatus according to the present exemplary embodiment includes at least two viewpoint 3D image signals for one 3D image. Here, one viewpoint 3D image signal is a minimum 3D image signal that is provided to view a 3D image through left eye and right eye of a viewer at one fixed viewing area.

Hereinafter, a 3D image signal of nine viewpoints will be described. For one example, the 3D image signal of nine viewpoints may be nine image signals for left and right eyes, which a subject of a three-dimensional structure is photographed at positions corresponding to viewing areas 1, 2, 3, 4, 5, 6, 7, 8, and 9. For another example, the 3D image signal of nine viewpoints may be image signals that are realized in a computer graphic to be corresponding to the viewing areas 1, 2, 3, 4, 5, 6, 7, 8 and 9.

Referring to FIG. 3, one viewpoint image signal of the nine viewpoint image signals may be classified into viewing areas 1, 2, 3, 4, 5, 6, 7, 8 and 9 in each of a plurality of groups. Each of viewing areas 1, 2, 3, 4, 5, 6, 7, 8 and 9 in a first group may view the same image signal as each of viewing areas 1, 2, 3, 4, 5, 6, 7, 8 and 9 in other groups. And, an image signal for right eye may be viewed at viewing areas 1 to 8, and an image signal for left eye may be viewed at viewing areas 2 to 9. Thus, a right and a left eye may be positioned respectively at the viewing areas 1 and 2, the viewing areas 2 and 3, the viewing areas 3 and 4, the viewing areas 4 and 5, the viewing areas 5 and 6, the viewing areas 6 and 7, the viewing areas 7 and 8 and the viewing areas 8 and 9, so that the 3D image provided to the display part 110 may be viewed.

Figure 4:
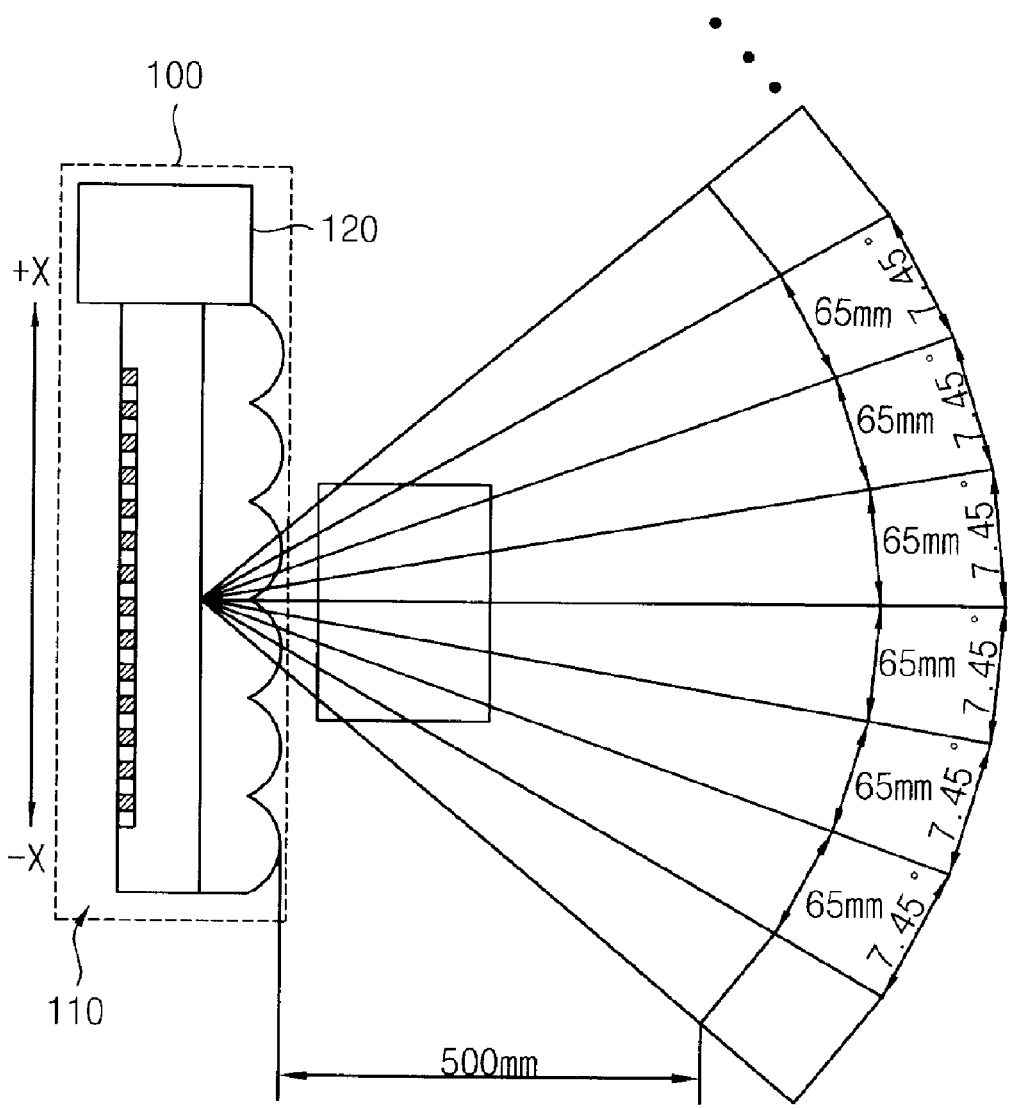
FIG. 4 is a conceptual diagram schematically showing a relationship between a viewing area and a viewing angle in a multi-viewpoint image display apparatus according to an exemplary embodiment of the present invention.

FIG. 4 is a conceptual diagram schematically showing a relationship between a viewing area and a viewing angle in a multi-viewpoint image display apparatus according to an exemplary embodiment of the present invention.

Referring to FIG. 4, if an optimized viewing distance of a display apparatus of multi-viewpoint image 100 is about 500 mm and a distance between a right eye of viewer and a left eye of viewer is 65 mm, a viewing angle of each viewing area may be about 7.45 degrees.

Hereinafter, an operation of a multi-viewpoint image display apparatus according to an exemplary embodiment of the present invention will be described.

Referring to FIG. 2, an image provided from a multi-viewpoint image display apparatus 100 may be divided into viewing areas 1 through 9 in each of the plurality of groups to be provided with a 3D image. Here, a multi-viewpoint image display apparatus 100 is spaced apart from and in front of a viewer by a predetermined viewing distance. A 3D image signal may be realized through the display part 110, which is selected from 3D image signals of a plurality of viewpoints, and that are more than two viewpoints.

In this case, although the right eye and left eye of a viewer are positioned at viewing areas 1 and 2, respectively, the viewer may view the 3D image that is substantially the same image as that viewed at the viewing areas 5 and 6. Alternatively, although the right eye and the left eye of the viewer are positioned at viewing areas 7 and 8, respectively, the viewer may view the 3D image that is substantially the same image as that viewed at the viewing areas 5 and 6.

Figure 5:
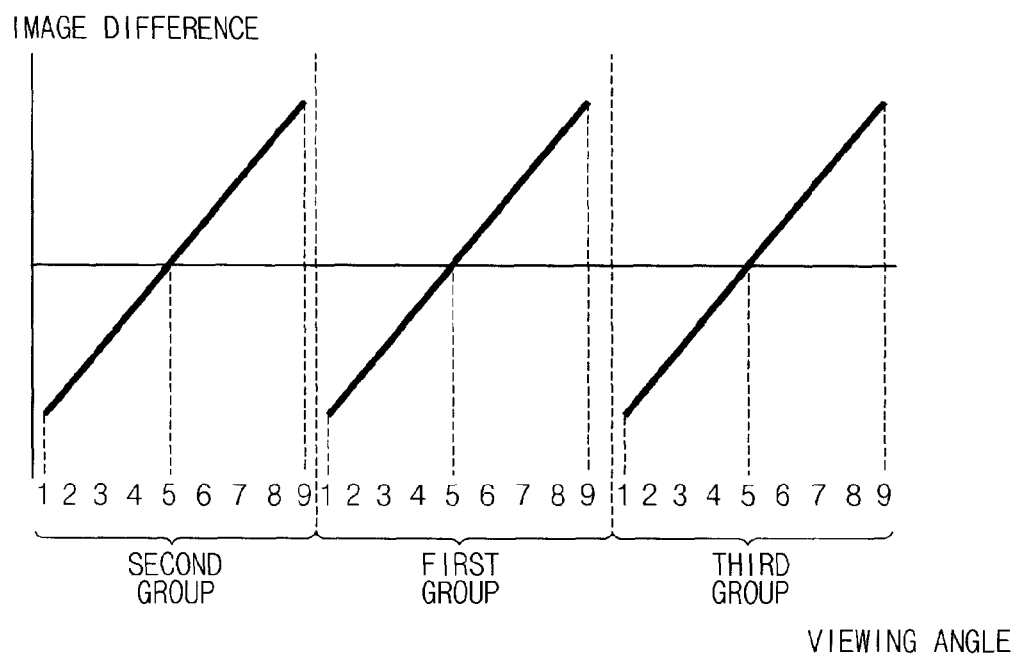
FIG. 5 is a graph schematically showing an image difference versus viewing angle by frame according to a conventional multi-viewpoint image display apparatus.

However, as a viewing angle of a multi-viewpoint image display apparatus is increased, an image difference is continuously increased as shown in FIG. 5.

Figure 6:
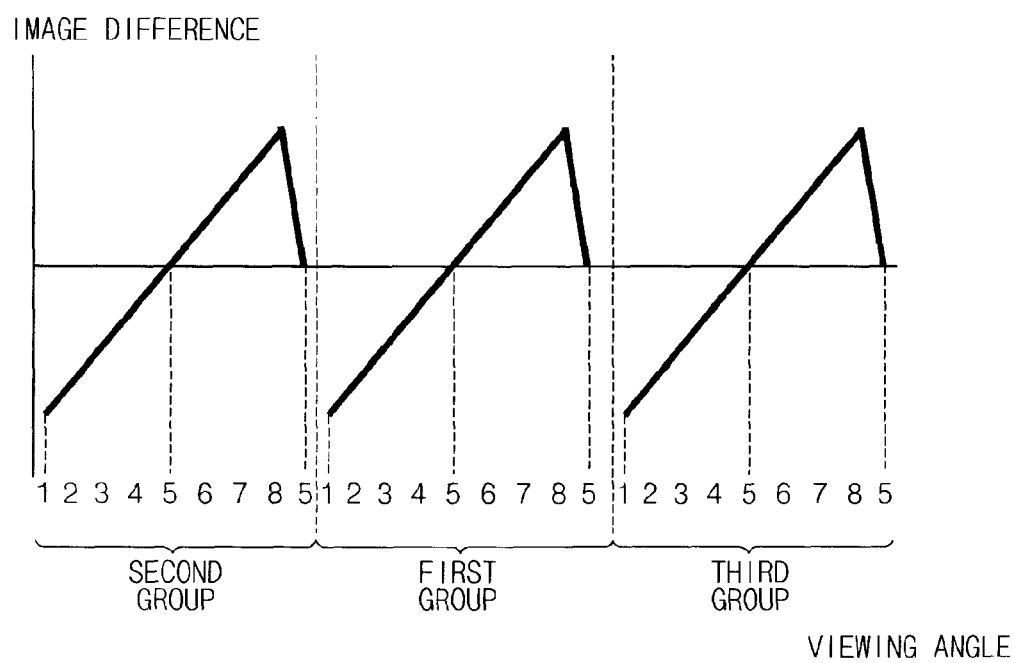
FIG. 6 is a graph schematically showing an image difference versus viewing angle by frame according to an exemplary embodiment of the present invention.

FIG. 5 is a graph schematically showing an image difference versus viewing angle by frame according to a conventional multi-viewpoint image display apparatus. FIG. 6 is a graph schematically showing an image difference versus viewing angle by frame according to an exemplary embodiment of the present invention Referring to FIG. 5, according to a conventional multi-viewpoint image display apparatus, according to viewing angles, the image provided from a multi-viewpoint image display apparatus 100 may be viewed at a plurality of groups, each of groups includes the viewing areas 1 through 9. And each image which is viewed at the viewing areas 1 through 9 of a first group may be the same as each image which is viewed in the viewing areas 1 through 9 of other group. At the first group, an image difference may be generated between number one viewpoint and number two viewpoint, and an image difference may be generated between number two viewpoint and number three viewpoint. That is, interference between viewpoints may be generated between adjacent viewpoints.

An image difference between number nine viewpoint of the second group and number one viewpoint of a first group is generated. In addition, an image difference between number nine viewpoint of the first group and number one view point of a third group is generated. That is, inversion area interference may be generated between adjacent groups.

Accordingly, the inversion area interference may be greater compared with the viewpoint interference, so that a display defect where a left image and a right image are exchanged may be generated if a 3D display operation is performed.

Referring to FIG. 6, in a multi-viewpoint image display apparatus according to an exemplary embodiment of the present invention, number nine viewpoint image signal of a first group is replaced with number five viewpoint image signal of the first group. Thus, an image difference between inversion areas (i.e., inversion area interference) is decreased in comparison with a conventional multi-viewpoint image display apparatus as shown in FIG. 5, so that an image inversion may decrease. In FIG. 6, number nine viewpoint image signal of the first group is replaced with number five viewpoint image signal of the first group; however, number one viewpoint image signal of the first group may be replaced with number five viewpoint image signal of the first group. Alternatively, number nine viewpoint image signal of the first group may be replaced with one of number two viewpoint image signal, number three viewpoint image signal, number four viewpoint image signal, number sixth viewpoint image signal, number seventh viewpoint image signal, number eighth viewpoint image signal.

In order to reduce the inversion area interference, the number of viewpoints may be increased to decrease a relative frequency of an inversion area, so that a probability that a viewer is positioned at an inversion area may decrease. However, if the number of viewpoints is increased, a 3D resolution may decrease. For example, if a 2D display apparatus having a resolution of 1920*1080 realizes a 3D image of nine viewpoints, a resolution of 640*360 may be realized. If the 2D display apparatus having a resolution of 1920*1080 realizes a 3D image of twelve viewpoints, a resolution of 480*360 may be realized.

However, according to an exemplary embodiment of the present invention, a resolution at a multi-viewpoint image display apparatus is not decreased in order to decrease inversion area interference.

In this exemplary embodiment of the present invention, the last viewpoint image signal (i.e., number nine viewpoint image signal) is replaced with the intermediate viewpoint image signal (i.e., number five viewpoint image signal) between adjacent groups in order to reduce inversion area interference. Alternatively, a first viewpoint image signal (i.e., number one viewpoint image signal) may be replaced with an intermediate viewpoint image signal (i.e., number five viewpoint image signal) in order to reduce inversion area interference.

FIG. 7 is a flow chart showing a method for displaying a multi-viewpoint image according to an exemplary embodiment of the present invention.

Referring to FIG. 7, it is checked whether N viewpoint image signals are inputted (step S100). Here, 'N' is a natural number that is greater than 2. The N viewpoint image signals may correspond to one frame.

Step S100 is ended if N viewpoint image signals are not inputted, and a display operation using a first viewpoint image signal is performed if N viewpoint image signals are inputted (step S110).

Then, it is checked whether there is a following viewpoint image signal after the first viewpoint image signal (step S120).

In step S120, if the following viewpoint image signal exists, it is checked whether the following viewpoint image signal is an (N)-th viewpoint image signal (step S130).

In step S130, if the following viewpoint image signal is not an (N)-th viewpoint image signal, a display operation through the following viewpoint image signal is performed (step S140), and it is fed back to step S120.

In step 130, if the following viewpoint image signal is an (N)-th viewpoint image signal, an (N)-th viewpoint image signal is replaced with a compensation viewpoint image signal (step S150).

Then, a display operation using the compensation viewpoint image signal is performed (step S160), and then it is fed back to S100.

As examples of the compensation viewpoint image signal, the compensation viewpoint image signal may be an image signal corresponding to a white gradation, to a black gradation, or a gray gradation.

As described above, according to a display method of the multi-viewpoint image, a 3D image defect such as a resolution decrease, an interference increase between viewpoints, etc., may not be decreased to minimize lowering of a stereo photography, and an inversion area interference may be decreased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for displaying a multi-viewpoint image, the method comprising:
   receiving a plurality of primitive image signals; and
   providing a display part with a first viewpoint image signal to a last viewpoint image signal,
   wherein the first viewpoint image signal to the next to last viewpoint image signal are based on the received primitive image signals, and
   the last viewpoint image signal is a compensation viewpoint image signal set to compensate for an inversion generated between a last viewing area of a first group and a first viewing area of a second group.

2. The method of claim 1, further comprising:
   displaying a first image to a last image which are corresponding to the first viewpoint image signal to the last viewpoint image signal, respectively,
   wherein the first image to the last image are viewed at a viewing position including the first group and the second group, each of the first group and the second group comprises a plurality of viewing areas corresponding to the first viewpoint image signal to the last viewpoint image signal, respectively.

3. The method of claim 2, wherein the first viewpoint image signal is a signal corresponding to a leftmost viewing area of one of the at least first and second groups, and a second viewpoint image signal following the first viewpoint image signal is a signal corresponding to a viewing area positioned to a right and adjacent to the leftmost viewing area.

4. The method of claim 3, wherein the last viewpoint image signal is a signal corresponding to a rightmost viewing area of the one of the at least first and second groups, and an image signal that is previous to the last viewpoint image signal is a signal corresponding to a viewing area positioned to a left and adjacent to the rightmost viewing area.

5. The method of claim 2, wherein the first viewpoint image signal is a signal corresponding to a rightmost viewing area of one of the at least first and second groups, and a second viewpoint image signal following the first viewpoint image signal is a signal corresponding to a viewing area positioned to a left and adjacent to the rightmost viewing area.

6. The method of claim 5, wherein the last viewpoint image signal is a signal corresponding to a leftmost viewing area of the one of the at least first and second groups, and an image signal that is previous to the last viewpoint image signal is a signal corresponding to a viewing area positioned to a right and adjacent to the leftmost viewing area.

7. The method of claim 1, wherein the compensation viewpoint image signal is an image signal corresponding to an intermediate viewpoint image signal of the primitive image signals.

8. The method of claim 1, wherein the compensation viewpoint image signal is an image signal corresponding to a white gradation.

9. The method of claim 1, wherein the compensation viewpoint image signal is an image signal corresponding to a black gradation.

10. The method of claim 1, wherein the compensation viewpoint image signal is an image signal corresponding to a gray gradation.

11. A display apparatus comprising:
a display part displaying an image; and
a driving control part receiving a plurality of primitive image signals and providing the display part with a plurality of multi-viewpoint image signals comprising a first viewpoint image signal to a last viewpoint image signal,
wherein the first viewpoint image signal to the next to last viewpoint image signal are based on the received primitive image signals, and
the last viewpoint image signal is a compensation viewpoint image signal set to compensate for an inversion generated between a last viewing area of a first group and a first viewing area of a second group.

12. The display apparatus of claim 11, wherein the image is viewed at a viewing position including the first group and the second group, each of the first group and the second group includes a plurality of viewing areas corresponding to the first viewpoint image signal to the last viewpoint image signal.

13. The display apparatus of claim 12, wherein the first viewpoint image signal is a signal corresponding to a leftmost viewing area of one of the first group and the second group, and a second viewpoint image signal following the first viewpoint image signal is a signal corresponding to a viewing area positioned to a right and adjacent to the leftmost viewing area.

14. The display apparatus of claim 13, wherein the last viewpoint image signal corresponds to a rightmost viewing area of the one of the first group and the second group, and an image signal that is previous to the last viewpoint image signal is a signal corresponds to a viewing area positioned to a left and adjacent to the rightmost viewing area.

15. The display apparatus of claim 12, wherein the first viewpoint image signal is a signal corresponding to a rightmost viewing area of one of the first group and the second group, and a second viewpoint image signal following the first viewpoint image signal is a signal corresponding to a viewing area positioned to a left and adjacent to the rightmost viewing area.

16. The display apparatus of claim 15, wherein the last viewpoint image signal is a signal corresponding to a leftmost viewing area of the one of the first group and the second group, and an image signal that is previous to the last viewpoint image signal corresponding to a viewing area positioned to a right and adjacent to the leftmost viewing area.

17. The display apparatus of claim 11, wherein the display part comprises:
a liquid crystal display panel; and
a viewing area separating part disposed on the liquid crystal display panel to separate a 3D image displayed on the liquid crystal display panel into a left image and a right image,
wherein the primitive image signals represent a plurality of primitive multi-view image signals.

18. The display apparatus of claim 11, wherein the display part comprises:
a liquid crystal display panel; and
a viewing area separating part disposed on the liquid crystal display panel to separate a 3D image displayed on the liquid crystal display panel into a left image and a right image, wherein the primitive image signals represents a plurality of primitive mono-view image signals, and the driving control part converts the primitive mono-view image signals into a converted multi-viewpoint image signal.

* * * * *